3,326,789
PROCESS FOR POLYMERIZING TRIOXANE BY IRRADIATING IN THE PRESENCE OF A HYDANTOIN
Ryoichi Wakasa, Shinichi Ishida, and Hiromichi Fukuda, Tokyo, Japan, assignors to Asahi Kasei Kogyo Kabushiki Kaisha, Osaka, Japan, a corporation of Japan
No Drawing. Filed Aug. 5, 1963, Ser. No. 300,044
Claims priority, application Japan, Aug. 6, 1962, 37/32,480
6 Claims. (Cl. 204—159.21)

This invention relates to a process for producing an improved polyoxymethylene having a high thermal stability.

Polyoxymethylene consisting of recurrence of —$CH_2O$— units has been known heretofore, and has been produced by polymerization of anhydrous formaldehyde or by polymerization of trioxane which is the cyclic trimer of formaldehyde.

The thermal stability and molecular weight of polyoxymethylene vary depending on the polymerization conditions. Polyoxymethylene having high molecular weight and high thermal stability is useful for producing moulded articles. However, the high thermal stability that is required when polyoxymethylene is left to stand at a high temperature for long periods of time has not heretofore been obtained, even when optimum polymerization conditions have been employed.

An object of the invention is to provide a process for producing polyoxymethylene having an excellent thermal stability. A further object of the invention is to provide a process for producing polyoxymethylene having excellent transparency in addition to said excellent thermal stability.

This invention contemplates a process for producing polyoxymethylene which comprises polymerizing trioxane in the co-presence of one or more hydantoins having the following general formula

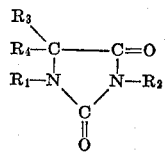

wherein $R_1$ and $R_2$ represent respectively hydrogen or a hydrocarbon group such as alkyl, aryl, cycloalkyl group, or acyl group, and $R_3$ and $R_4$ represent respectively hydrogen or a hydrocarbon group such as alkyl, aryl or cycloalkyl group, and $R_3$ and $R_4$ may form a ring mutually.

The above said hydantoins include, e.g., 5-methyl hydantoin, 5-ethyl hydantoin, 5-isopropyl hydantoin, 5,5'-dimethyl hydantoin, 5,5'-diethyl hydantoin, 5-phenyl hydantoin, 5,5'-diphenyl hydantoin, 5,5'-methyl phenyl hydantoin, 5,5'-tetramethylenespiro hydantoin, 5,5'-pentamethylenespiro hydantoin, 5,5'-hexamethylenespiro hydantoin, 1-acetyl-5-methyl hydantoin, 1,3 - diacetyl-5-methyl hydantoin, etc.

The hydantoin and trioxane are caused to exist together in the form of a eutectic crystal, a mixed crystal, a simple mixture, or in the eutectic state or as a mixed solution. For example, there may be employed a mixed solution obtained by dissolving the hydantoin and trioxane into toluene or an alcohol; precipitate obtained by recrystallization from said mixed solution; a precipitate obtained by evaporation to a dry state; and a precipitate obtained by repeated recrystallization.

The amount of hydantoins to be used is not necessarily restrictive, but an amount of less than 50% by weight, preferably less than 30% by weight based on trioxane to be polymerized is employed, and the minimum effective amount is selected depending on the properties of polyoxymethylene to be manufactured; generally an amount of more than 0.5% by weight is effectively employed.

The polymerization of said system consisting of trioxane and hydantoin is generally carried out by using a conventional process. Namely, solution polymerization is carried out by using a well known catalyst such as a co-ordinate complex compound of boron fluoride, especially the etherate or complex compound with phenol or acetic acid thereof, or inorganic fluorides such as antimony trifluoride, bismuth trifluoride, aluminum trifluoride or zinc fluoride, etc.

Application of radio-active rays are further employed as a process for facilitating the polymerization reaction of the invention. This process comprises polymerizing the trioxane hydantoin system in the solid state by irradiation with radioactive ray. This process is advantageous because of the simplicity of the polymerization procedure. The radioactive ray-polymerization or other conventional polymerization processes can be similarly carried out without any substantial difference in the polymerization of trioxane hydantoin system.

Though it is not clear whether hydantoin is included in the polyoxymethylene in the form of a co-polymer or is merely included in a mixed state, the polyoxymethylene obtained by the process of the invention can produce moulded articles having improved thermal stability and transparency as compared with polyoxymethylene using no hydantoin.

Polyoxymethylene in which hydantoin is merely admixed has also a clearly improved thermal stability. However, according to the process of the invention in which trioxane is polymerized in the co-presence of hydantoin, an important additional improvement is the increase in that the transparency of the moulded product.

Heretofore, polyoxymethylene employed in moulding is generally opaque and the moulded products have a white or pale yellow color and are scarcely transparent. This fact is extremely restrictive in use and constitutes a severe obstacle to the use of polyoxymethylene as a high polymer. On the contrary, according to the invention, there can be obtained polyoxymethylene moulded products which are perfectly transparent in the case of thin plates or films and are semitransparent in the case of thick plates or moulds, while in addition excellent thermal stability is obtained. Accordingly, the use of the polyoxymethylene can be extended where transparency is required, i.e., for light fixtures, tableware, screen, panel and other moulded articles.

Hydantoins may be used in combination with conventional stabilizers described hereinunder:
 (a) Hydrazide, stabilized hydrazine and hydrazine,
 (b) Secondary or tertiary aromatic amine,
 (c) Phenol or substituted phenol,
 (d) Urea, thiourea and the substituted product thereof,
 (e) Polycarboxylic acid amide.

The details of the process of the invention will be better understood from a consideration of the following examples which are merely given for the sake of illustration.

*Example 1*

10 g. of trioxane was introduced into a glass ampule replaced with nitrogen gas, and 20 g. of toluene was then added thereto to dissolve the trioxane, after which 2 g. of diphenylhydantoin was added followed by 0.5 ml. of boron fluoride etherate. The glass ampule was closed tightly in nitrogen atmosphere. The ampule was heated at a temperature between 66° C. and 68° C. for 4 hours, and then the glass ampule was opened to remove the polymer therefrom. The polymer was washed with 5% hot sodium carbonate solution, water and alcohol, and was subjected to vacuum drying. The transparency of the thin plate produced by moulding said polymer at 200° C. was superior to the transparency of the polymer obtained in the same manner but without the hydantoin.

*Example 2*

Properties of the polymer obtained in the same manner as in Example 1 except that hydantoins were used in an amount of 10% by weight based on trioxane are shown in the following table.

| Hydantoin | Thermal decomposition velocity of the polymer, $K_{222}$ (Percent/min.) | Transparency of mould |
|---|---|---|
| None | 4.27 | Opaque and foaming. |
| 5-methylhydantoin | 0.42 | Somewhat opaque. |
| 5'5'-dimethylhydantoin | 0.27 | Semitransparent. |
| 5'5'-pentamethylenespirohydantoin. | 0.21 | Do. |
| 5-phenylhydantoin | 0.26 | Do. |

*Example 3*

Trioxane (10 g.) and 5,5'-pentamethylenespirohydantoin (2 g.) were grounded and mixed. $2.4 \times 10^6 \gamma$ of $\gamma$-ray radiated from $Co^{60}$ (300 curies) was applied to the resulting mixture at 50° C. The obtained polymer was washed with toluene and was dried.

The mould obtained from the polymer was almost colorless and transparent, whereas that obtained from a polymer produced in the same manner without adding hydantoin was perfectly opaque.

*Example 4*

Trioxane (10 g.) and hydantoin described hereinunder were co-precipitated by using ethanol, and the precipitate was subjected to vacuum drying. $2.4 \times 10^6 \gamma$ of $\gamma$-ray radiated from $Co^{60}$ was applied to the precipitate to yield a polymer. The thus obtained polymers have the following properties.

| Hydantoin | Add. amount (percent by wt.) | Decomposition velocity of polymer, $K_{222}$ (percent/min.) | Transparency of mould |
|---|---|---|---|
| None | 0 | 2.00 | White and opaque. |
| 5-methylhydantoin | 5 | 0.96 | Do. |
| Do | 10 | 0.69 | White and semitransparent. |
| Do | 25 | 0.35 | White and uniformly transparent. |
| 5,5'-dimethylhydantoin | 5 | 0.77 | White and opaque. |
| Do | 10 | 0.57 | Semitransparent. |
| Do | 25 | 0.48 | Comparatively transparent. |
| 5-phenylhydantoin | 5 | 0.44 | Opaque. |
| Do | 10 | 0.51 | Somewhat opaque. |
| Do | 20 | 0.02 | Uniformly transparent. |
| Do | 25 | 0.06 | Do. |
| 5,5'-pentamethylenespirohydantoin. | 1 | 1.00 | White and opaque. |
| Do | 5 | 0.79 | White and uniformly transparent. |
| Do | 10 | 0.75 | White and semitransparent. |
| Do | 25 | 0.02 | Almost transparent. |

NOTE.—$K_{222}$ (percent/min.) represents the decomposition velocity in the treatment in methylsalicylate vapor for 10 minutes.

What we claim is:

1. A process for producing polyoxymethylene which comprises polymerizing trioxane in a solid state by exposure to irradiation in the co-presence of a hydantoin having the following general formula

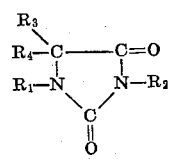

wherein $R_1$ and $R_2$ represent respectively hydrogen or a hydrocarbon group having no more than 6 carbon atoms and selected from the class consisting of alkyl, aryl, cycloalkyl, and acyl, and $R_3$ and $R_4$ represent respectively hydrogen or a hydrocarbon group having no more than 6 carbon atoms and selected from the class consisting of alkyl, aryl, and cycloalkyl and $R_3$ and $R_4$ may form a ring mutually.

2. A process as claimed in claim 1, wherein said hydantoin is employed in an amount ranging from 0.5% to 50% by weight of trioxane.

3. A process for producing polyoxymethylene which comprises combining trioxane and a hydantoin either in solid state or in non-aqueous solution, heating the trioxane and hydantoin in the presence of an acid catalyst to form a polymer, said hydantoin having the following general formula:

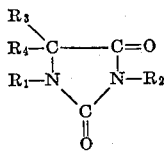

wherein $R_1$ and $R_2$ represent respectively hydrogen or a hydrocarbon group having no more than 6 carbon atoms and selected from the class consisting of alkyl, aryl, cycloalkyl, and acyl, and $R_3$ and $R_4$ represent respectively hydrogen or a hydrocarbon group having no more than 6 carbon atoms and selected from the class consisting of alkyl, aryl, and cycloalkyl and $R_3$ and $R_4$ may form a ring mutually.

4. A process as claimed in claim 3 wherein the trioxane and hydantoin are heated at a temperature of 66° to 68° C. for 4 hours.

5. A process as claimed in claim 3 wherein the hydantoin is present in an amount of from 0.5 to 50% by weight of trioxane.

6. A process as claimed in claim 3 wherein the trioxane and hydantoin are in solution in toluene.

References Cited

UNITED STATES PATENTS 2,532,278  12/1950  Chadwick _____ 260—67.5
3,155,636  11/1964  Kritzler et al. _____ 260—67

OTHER REFERENCES

Kern et al., Angewandte Chemie, 73, No. 6, March 21, 1961, pp. 177–186. (Pages 179–182 relied upon.)

Okamura et al., Isotopes and Radiation, vol. 3, No. 5 (1960), pp. 416–418.

WILLIAM H. SHORT, *Primary Examiner.*

SAMUEL H. BLECH, L. M. PHYNES,

*Assistant Examiners.*